United States Patent [19]
Kasai et al.
[11] Patent Number: 5,028,934
[45] Date of Patent: Jul. 2, 1991

[54] HAND-HELD PORTABLE PRINTING SYSTEM

[75] Inventors: Kazuaki Kasai; Masahiro Minowa; Koichiro Komatsu; Ikuo Ito, all of Suwa, Japan

[73] Assignee: Seiko Epson Corporation, Japan

[21] Appl. No.: 428,581

[22] Filed: Oct. 30, 1989

[30] Foreign Application Priority Data

| | | | |
|---|---|---|---|
| Oct. 31, 1988 | [JP] | Japan | 63-274996 |
| Nov. 10, 1988 | [JP] | Japan | 63-146910[U] |
| Apr. 21, 1989 | [JP] | Japan | 1-102270 |
| Apr. 27, 1989 | [JP] | Japan | 1-108567 |

[51] Int. Cl.[5] .......... G01D 15/10; B41J 3/28
[52] U.S. Cl. .......... 346/76 PH; 346/163; 400/120; 358/474
[58] Field of Search .......... 400/120; 346/143, 76 PH; 358/472, 473, 474

[56] References Cited

U.S. PATENT DOCUMENTS

| | | | |
|---|---|---|---|
| 4,609,295 | 9/1986 | Shimodaira | 346/143 |
| 4,689,638 | 8/1987 | Matsuzaki et al. | 346/76 PH |
| 4,706,095 | 11/1987 | Ono et al. | 346/76 PH |
| 4,706,096 | 11/1987 | Sato | 346/76 PH |
| 4,707,706 | 11/1987 | Nagano | 346/76 PH |
| 4,868,676 | 9/1989 | Matsuura et al. | 346/76 PH |

FOREIGN PATENT DOCUMENTS

| | | | |
|---|---|---|---|
| 13551 | 1/1985 | Japan . | |
| 0072574 | 4/1986 | Japan . | |
| 0220358 | 9/1987 | Japan | 400/120 |
| 268660 | 11/1987 | Japan . | |
| 0107570 | 5/1988 | Japan | 400/120 |
| 185642 | 8/1988 | Japan . | |
| 0231364 | 9/1988 | Japan . | |
| 280658 | 11/1988 | Japan . | |

*Primary Examiner*—Benjamin R. Fuller
*Assistant Examiner*—Huan Tran
*Attorney, Agent, or Firm*—W. Douglas Carothers, Jr.

[57] ABSTRACT

A portable printing system is provided for printing an image, such as alphanumeric or symbol information on a moveable recording medium, such as a tape, a sheet or the like, by means of manual scanning of the recording medium relative to the printing system. The printing system comprises a hand-held printer unit including a print head having an array of printing elements in combination with an adjacently disposed drive roller both disposed in cooperative arrangement along one edge of the printer unit. The drive roller is coupled to an encoder inside the unit that generates timing pulses upon rotational movement of the drive roller which control the rate of printing at the printing head of the printer to synchronize printing with the rate of movement of the recording medium relative to the printer unit. The printer unit may be detachably mounted to a recording medium transport unit which includes a platen which is engaged by the drive roller and print head with a recording medium and ink ribbon disposed between the print head and the platen. Alternatively, the printer unit may be hand-held with the drive roller and print head in engagement with a flat recording medium, such as an ordinary paper sheet. In either case, the recording medium travels in a path substantially perpendicular to the array of printing elements on the print head. A combination of two tape recording mediums is also disclosed to provide means to protect the printed image from the possibility of smudges and smears or other image deterioration from occurring directly on the printed image.

29 Claims, 7 Drawing Sheets

HAND-HELD PORTABLE PRINTING SYSTEM

BACKGROUND OF THE INVENTION

This invention relates generally to a hand-held printer to function as a portable type word processor, copy machine, lettering or labeling machine or the like in which characters, numerals, symbols or other such images or the like are printed on a tape or ribbon printing material or other recording medium. In addition, the present invention relates to a recording medium transport unit which is detachably mounted to a hand-held portable printer unit.

In a conventional portable printing system including a tape medium transport device, the printing system is arranged such that the printer unit is formed integrally with the recording medium transport unit or, alternatively, the tape medium transport device per se is used exclusively also as a tape medium printer. This approach renders such a unit large in size. In addition, the prior art printer system of this type has adopted a method in which an ink ribbon is interposed between the recording medium unit and a printing or font mechanism disposed in face-to-face relation with a recording medium surface and ink is transferred onto the recording medium surface via the printing mechansim to effectuate printing.

Since the conventional printer with a tape transport device for printing on a tape type of recording medium has been of large size, there have been several drawbacks, among others, in that the device is expensive, inconvenient to carry and requires a relatively large space for installation. In addition, there is another drawback in that since the tape transport device is formed integrally with a printing unit, the recording medium is confined to use only with a tape type recording medium or the like.

Furthermore, in the case of the printer for printing on a tape type of medium material, printing is effected on a tape surface so that there has been a further problem in that when the printed recording medium surface is, for example, incidentally or accidentally touched or rubbed, printing stains, image smudges or smears as well as fragmentary portions of printed characters result rendering the image quality too deteriorated for practical use and understandable observation.

Thus, it is an object of this invention to provide a convenient and portable means that will provide a reliable, permanent ink image on a conventional tape medium which may be used for labeling or the like and wherein the printed image on the medium is protected from any smudging, smearing and other possible environmental deterioration.

SUMMARY OF THE INVENTION

According to this invention, a portable printing system comprising a hand-held printer and a recording medium transport unit may be used for both conventional printing through manual operation as a rudimentary portable word processor, copy, printing or labeling machine or the like and provide for printing on a recording medium through the use of a simple mechanism thereby overcoming the above mentioned drawbacks. Also, a compact printer with a simple mechanism is capable of ensuring the stability and longevity of the printed image formed and is free of the occurrence of printing smudges, smears and stains and fragmentary missing portions of printed characters on the recording medium occurring after printing due to subsequent handling of the record medium.

In particular, the portable printing system of this invention is provided for printing an image, such as alphanumeric or symbol information on a moveable recording medium, such as a tape, a sheet or the like, by means of manual scanning of the recording medium relative to the printing system. The printing system comprises a hand-held printer unit including a print head having an array of printing elements in combination with an adjacently disposed drive roller both disposed in cooperative arrangement along one edge of the printer unit. The drive roller is coupled to an encoder inside the unit that generates timing pulses upon rotational movement of the drive roller which control the rate of printing at the printing head of the printer to synchronize printing with the rate of movement of the recording medium relative to the printer unit. The printer unit may be detachably mounted to a recording medium transport unit which includes a platen which is engaged by the drive roller and print head with a recording medium and ink ribbon disposed between the print head and the platen. Alternatively, the printer unit may be hand-held with the drive roller and print head in engagement with a flat recording medium, such as an ordinary paper sheet. In either case, the recording medium travels in a path substantially perpendicular to the array of printing elements on the print head. A combination of two tape recording mediums may be employed as a means to protect the printed image from the possibility of smudges and smears or other image deterioration from occurring directly on the printed image.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
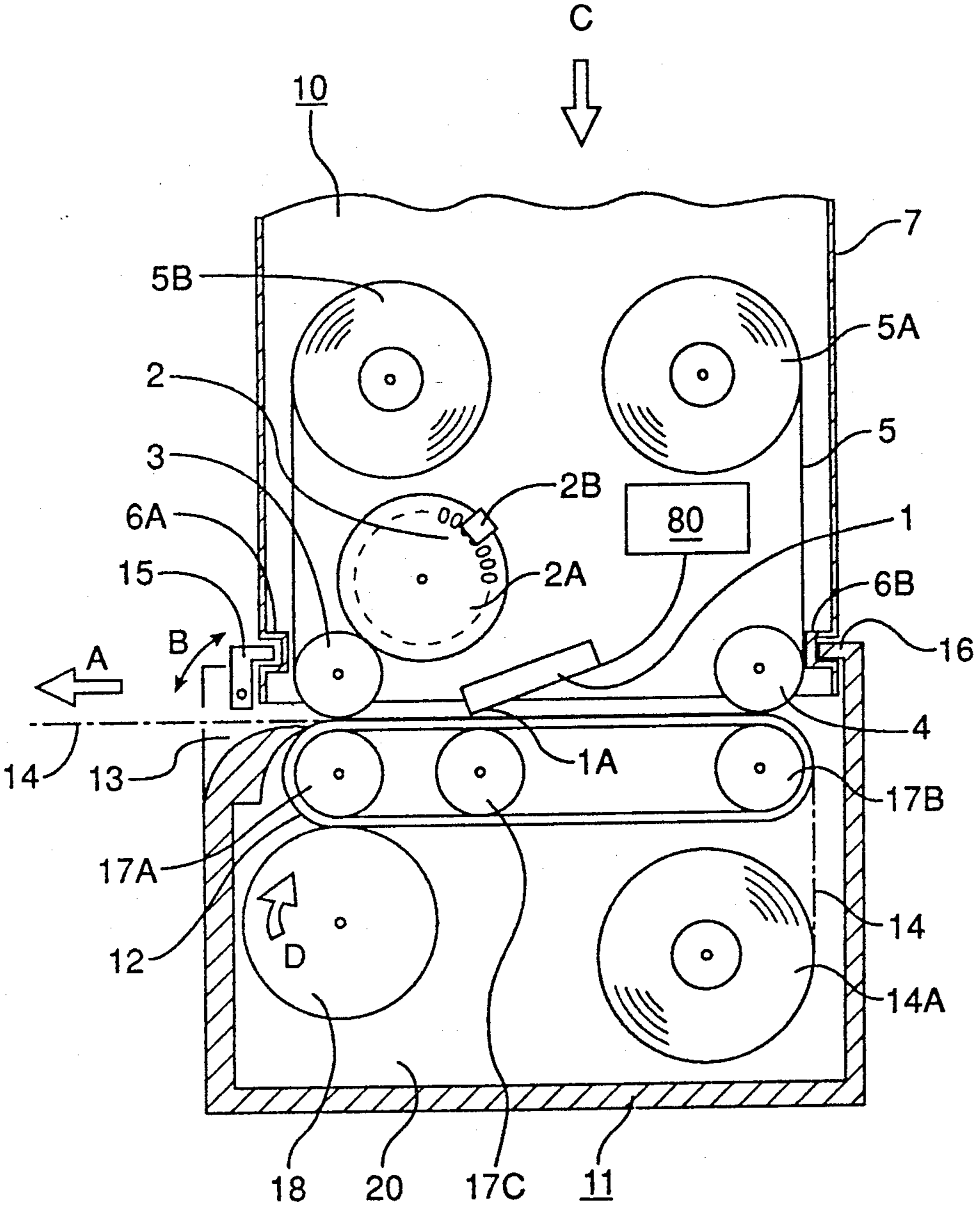
FIG. 1 is a schematic view of an embodiment of a portable printing system comprising a hand-held printer and a recording medium transport unit in accordance with this invention.

Reference is now made to FIG. 1 wherein there is shown a portable printing system in accordance with this invention comprising an upper housing 7 for hand-held printer unit 10 and a lower housing 11 for recording medium transport unit 20. Mounted in upper housing 7 is a thermal head 1 for printing and an encoder 2 employed as a means for position detection to synchronize the printing of an image with the movement of recording medium 14 through transport unit 20. An encoder drive roller 3 is mounted to engage the periphery of encoder 2 and also engages ink ribbon with recording medium 14 in unit 20 so that roller 3 is rotated with movement of ribbon 5 and medium 14 which, in turn, also rotates encoder 2. Ink ribbon 5 is drawn from supply roll 5A around auxiliary guide roller 4, under thermal head 1 and thence around drive roller 3 onto takeup roll 5B.

Lower housing 11 contains recording medium transport unit 20 which comprises a closed loop belt 12 supported for movement about support guide rollers 17A, 17B and 17C. Recording medium 14 is supported on supply roll 14A and is fed from roll 14A over the surface of belt 12 and out opening 13. Drive roller 18 is adapted to draw recording medium 14 out of housing 11 by rotation of a manual knob (not shown) on the outside of housing 11 in the direction indicated by arrow D. Roller 18 engages and drives closed loop belt 12 in a counterclockwise direction which, in turn, feeds medium 14 from supply roll 14A in combination with ink ribbon from supply roll 5A between guide roller 4 and belt 12 supported on guide roller 17B, thence underneath thermal head 1 and belt 12, supported at this point by guide roller 17C, thence between encoder drive roller 3 and belt 12, supported on guide roller 17A, and finally out opening 13. Roller 17C is disposed underneath belt 12 against the undersurface thereof at a position opposite heating element 1A of thermal head 1 and serves as a platen for head 1 by rotating in conjunction with the movement of belt 12.

Drive roller 18 may also be automatically advanced in transport unit 20 by means of a miniature electrical step motor or the like in lieu of a manual advancement via a manual knob. The use of such a step motor is also applicable in other embodiments of this invention to be discussed in detail below.

Upper housing 7 and lower housing 11 are coupled together by means of rotatable projection 15 and fixed projection 16 located at opposite upper edges of lower housing 11, which correspondingly engage recesses 6A and 6B located on opposite lower edges of upper housing 7. Projection 15 is urged into an upright position in a clockwise direction by means of a spring or the like (not shown).

In operation, housings 7 and 11 are first separated. Ribbon supply roll 5A has been previously positioned in unit 10 and drawn around rollers 3 and 4 onto takeup roll 5B. Recording medium 14 in lower housing 11 is then drawn from supply roll 14A in transport unit 20 out along the surface of belt 12 and through opening 13. Next, printer housing 7 is pressed against medium transport unit housing 11, in the direction indicated by arrow C in FIG. 1, which causes projection 16 of housing 11 to engage with recess 6B of housing 7 and, further causes rotatable projection 15 to move, first, away from and then into seated engagement in recess 6A of housing 7, as indicated by double headed arrow B. This action completes the mounting of printer unit 10 on medium transport unit. If printer unit 10 is set in its print mode, medium 14 is fed in the direction of arrow A by rotation in a clockwise direction of the above mentioned manual knob which causes belt 12 to rotate in a counterclockwise direction about rollers 17A and 17B, which also causes ink ribbon 5 to be drawn from supply 5A and, further, causes drive roller 3 to rotate and drive encoder 2. As a result, timing pulses corresponding to the amount of movement of medium 14 are generated by encoder 2. In correspondence with these timing pulses, information data, such as alphanumeric or symbol information or other types of images, is transferred to theremal head 1 from a data source, such as controller means 80 illustrated in FIG. 7, and this data is printed on medium 14 via ink ribbon 5.

With respect to the embodiment of FIG. 1, as well as subsequent embodiments to be hereinafter discussed, recording medium 14 may be of any suitable printing material, such as vinyl tape, cellophane tape as well as ordinary paper tape. It is also possible to supply the medium in sheet form, fanfold form, or as labels or the like beside the use of a recording medium in a roll, tape or ribbon form.

In the case where belt 2 is fabricated of silicone rubber or other such similar material that permits easy releasability of an adhesive agent used in conjunction with adhesive tape surfaces, it is possible to employ commerically available adhesive tapes as a recording medium 14. Also. a double coated adhesive tape medium with a separator provided on its back surface may be employed as a medium 14, although this type of medium is more expensive than conventional adhesive tape. If so employed, it is not necessary to restrict the materail of belt 12 of a particular material, such as silicone rubber. While the cost of a separator-adhesive tape medium is more expensive and, further is more easily employed after printing, compared to a commerically available adhesive type tapes, there are advantages in using either type of tape as a recording medium in their selection for particular applications with attention to cost effective use thereof in meeting the particular needs of those applications.

It should be noted that, although belt 12 is employed in the above mentioned embodiment, belt 12 may be eliminated, in which case, the travel of medium 14 is still possible through unit 20 via rollers 17A, 17B and 17C, although stable transport characteristics, such as medium alignment, during printing are, to some extent, less convenient and reliable.

Figure 2:
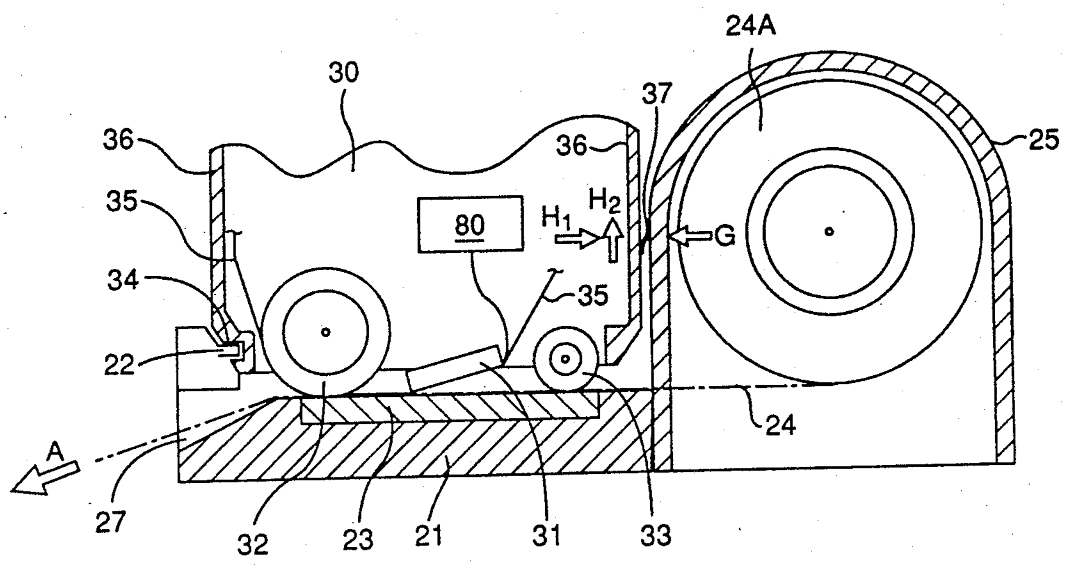
FIG. 2 is a schematic view of another embodiment of a portable printing system comprising a hand-held printer and recording medium transport unit in accordance with this invention.

FIG. 2 is a schematic diagram of another embodiment of a portable printing system of this invention comprising hand-held printer unit 30 coupled to medium transport unit 21 wherein only a portion of printer housing 36 is shown. Medium transport unit 12 has as its main components a flat or platen 23 with an upper smooth surface having a low coefficient of friction to provide for relative easy movement of medium 24 across its surface. As an example, the upper surface of plate 23 may be formed of low friction coefficient materials, such as, high density polyethylene. Telfon coated rubber or the like, to enhance medium travel in its path over platen 23. Alternatively, these platen materials may be provided as a plurality of strips on the upper surface of platen 23 to reduce further the frictional engagement of medium 24 of the platen surface particularly under the pressure of auxiliary roller 33, head 31 and drive roll 32. As a further alternative, these platen materials may be limited exclusively to specific regions of platen 23 opposite to auxiliary roller 33, head 31 and drive roll 32.

Supply roll 24A is rotatably supported in housing unit 25 and is drawn out of unit 25 between auxiliary roller 33 and platen 23, thence between thermal head 31, ink ribbon 35 and platen 23, thence between drive roll 32 (also adapted to drive encoder 2 not shown in this figure) and platen 23, and thence out of opening 27 in the direction indicated by arrow A. Auxiliary guide roller 33 provides for stabilized transport of medium through unit 21 by preventing meandering motion, skewing or lateral shifting of medium 24 in its path of travel.

Printer unit 30 and medium transport unit 21 are coupled together by means of a projection 22 on unit 21 that engages recess 34 in housing 34 of printer unit 30. Printer unit 30 is held in position on projection 22, for example, by means of the force, G, of leaf spring 37 on unit 25. Removal of printer unit 30 is accomplished by moving unit 30 laterally against the force, G, of leaf spring 37, as illustrated by arrow $H_1$ and, then, upwardly away from transport unit 21, as illustrated by arrow $H_2$.

In operation, printer 30 and transport unit 21 are initially separated. Medium 24 in unit 25 is first drawn from supply roll 24A along platen 23 and out opening 27. Next, the recess 34 in printer housing 36 is brought into engagement with projection 22 of device 21 and housing 36 is rotated in a clockwise direction about projection 22 until guide roller 33 engages medium 24 on the surface of platen 23. This action completes the mounting of printer unit 30 on medium transport unit 21. If printer unit 30 is set in its print mode, medium 24 is fed in the direction of arrow A by pulling out the leading edge of medium 24 with one's finger tips. This movement of medium 24 causes the rotation of drive roll 32 which, in turn, produces a series of timing pulses from encoder 2. Information data is provided at thermal head 31, such as via controller means 80 in FIG. 7 to be discussed later, which applies heat to selected head elements according to the addressed data to head 31 which, in turn, causes the transfer of ink from ribbon 35 onto medium 24 in imagewise formation synchronized with the timing pulses generated from encoder 2.

Figure 3:
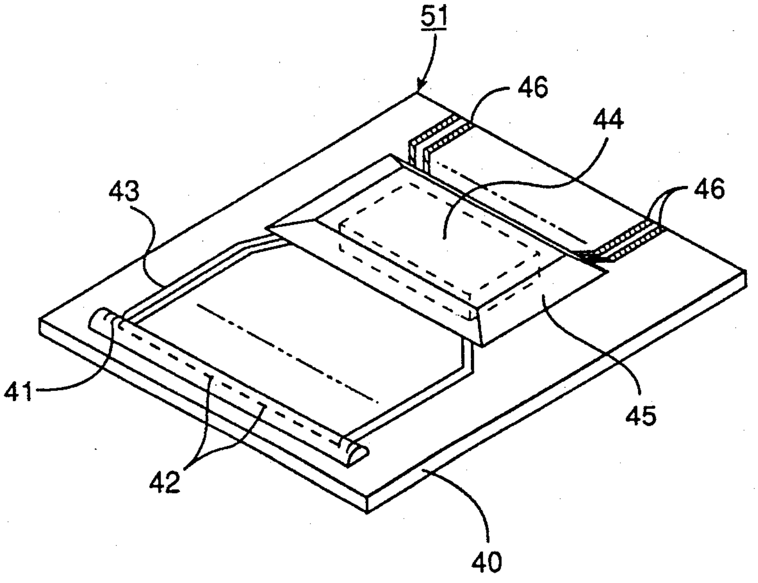
FIG. 3 is a perspective view of a configuration of a thermal print head that may be employed in the embodiments of the hand-held printer of this invention.

FIG. 3 discloses an example of a type of thermal print head that may be employed in any of the embodiments of this invention for thermal print head 1, 31 and 51 but will be referred to here as head 51. Thermal print head 51 comprises a base 40 of a ceramic material or the like. Heating or writing elements 42 are embodied in a glazing compound 41 adjacent one edge of base 40 and the surface of elements 42 are exposed in a manner to be place in engagement with the traveling ink ribbon and recording medium, with thermal head 51 mounted in the upper printer housing in the manner as previously illustrated in FIGS. 1 and 2. A row of electrodes 43 are respectively connected to heating elements 42 and electrodes 43 are respectively connected to terminal outputs of IC driver chip 44 which electrically drives thermal head heating elements 42. IC driver chip 44 is referred to herein, in part, as data transfer means. Input signals representing serial information data, enable signals and power supply from controller means 80 is fed into terminal inputs of chip 44 via input electrodes 46. Chip 44 is encapsulated with an encapsulating material 45 and a thermal radiator is secured to head 51 prior to its mounting in the printer housing.

Figure 4:
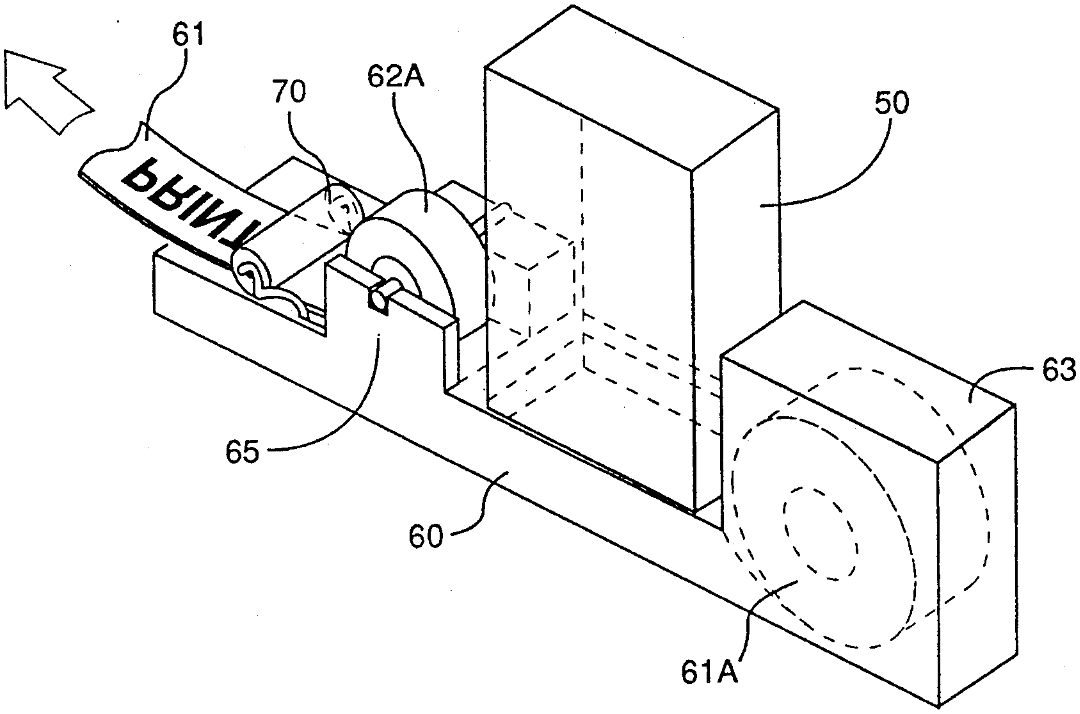
FIG. 4 is a perspective view illustrating a still further embodiment of a portable printing system in accordance with this invention.
Figure 5B:
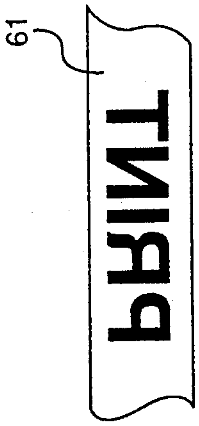
FIG. 5B is an example of the printed surface of a transparent tape medium from the printer shown in FIG. 5A operating in its data inverted mode, I, as seen through the same side of the medium as printed thereon.
Figure 5A:
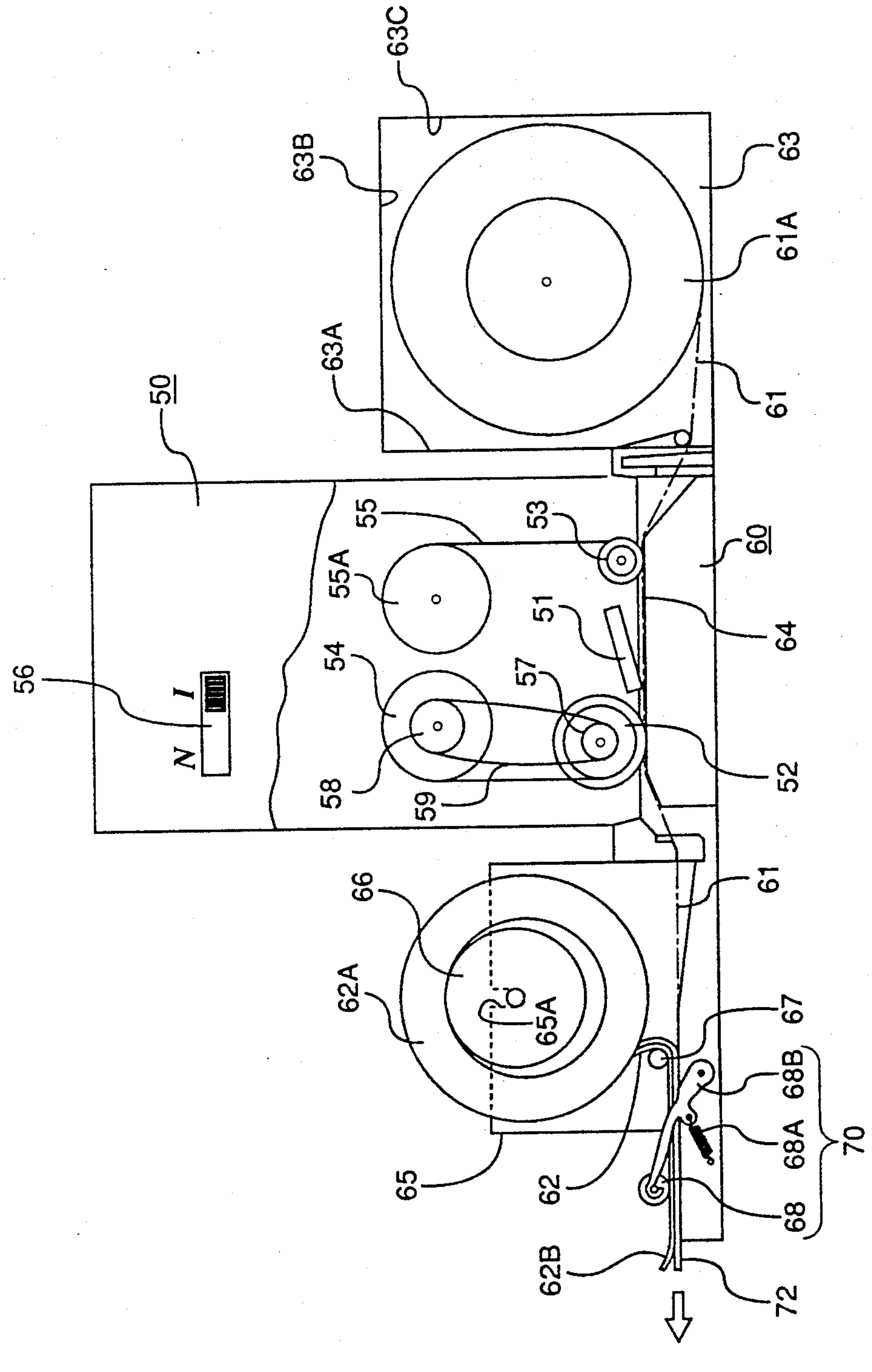
FIG. 5A is a side elevation of the embodiment shown in FIG. 4.

FIG. 4 is a perspective view illustrating another embodiment of a portable printing system comprising this invention while FIG. 5A is a side elevation of the overall arrangement shown in FIG. 4. The printing system comprises portable printer unit 50 which is detachable from recording medium transport unit 60. Unit 50 includes, as its main components for printing, ink ribbon 55, thermal print head 51 and head controller means 80 to be described later. Unit 60 includes means for integrally supporting housing unit 63, platen 64, support unit 65 including contact bonding means 70. A combination transparent tape medium 61 and a pressure sensitive double coated adhesive tape medium 62 are employed with the portable printing system. The body of printer unit 50 is brought into engagement with the upper surface of plate or platen 64. Transparent tape medium 61, drawn from housing unit 63 and along plate 64, is engaged by drive roller 52 and auxiliary guide roller 53, along with ink ribbon 55, to undergo linear movement therebetween. Printing is effected by thermal print head 51 which is interposed between drive roller 52 and auxiliary roller 53. Ink ribbon 55 is adapted to travel from supply roll 55A about guide roller 53, thence between head 51 and plate 64, thence about drive roller 52, and thereafter taken up on takeup roll 54. As shown in FIG. 5A, pulleys 57, 58 are respectively secured to drive roller 52 and takeup roll 54 and the rotation of drive roll 52 is also imparted to takeup roll 54 by means of an elastic drive belt 59 stretched over pulleys 57 and 58. In addition, the rotary motion of drive roller 52 is also imparted to encoder 2 (not shown in this embodiment) in the same manner as explained in connection with FIG. 1 to generate timing pulses.

Input information data is fed to selected heating elements 42 of thermal print head 51 via head controller means 80, to be described later is connection with FIG. 7. In response to selectively heated head elements, ink from ink ribbon 55 is transferred onto transparent tape medium 61 in imagewise formation with image printing synchronized with tape madium movement via the timing pulses generated from encoder 2.

Printer unit 50 includes a mode switch 56 on one side surface thereof, which is shown in FIG. 5A. Mode switch 56 provides for the setting of two different modes for data printing: the normal mode, N, wherein the data, such as the character illustrated in FIG. 8A will be printed in its original upright form on transparent tape medium 61, or the inverted mode, I, wherein the data, such as the characters illustrated in FIGS. 8B and 5B, will be printed upside down on transparent tape medium 61.

Figure 9:
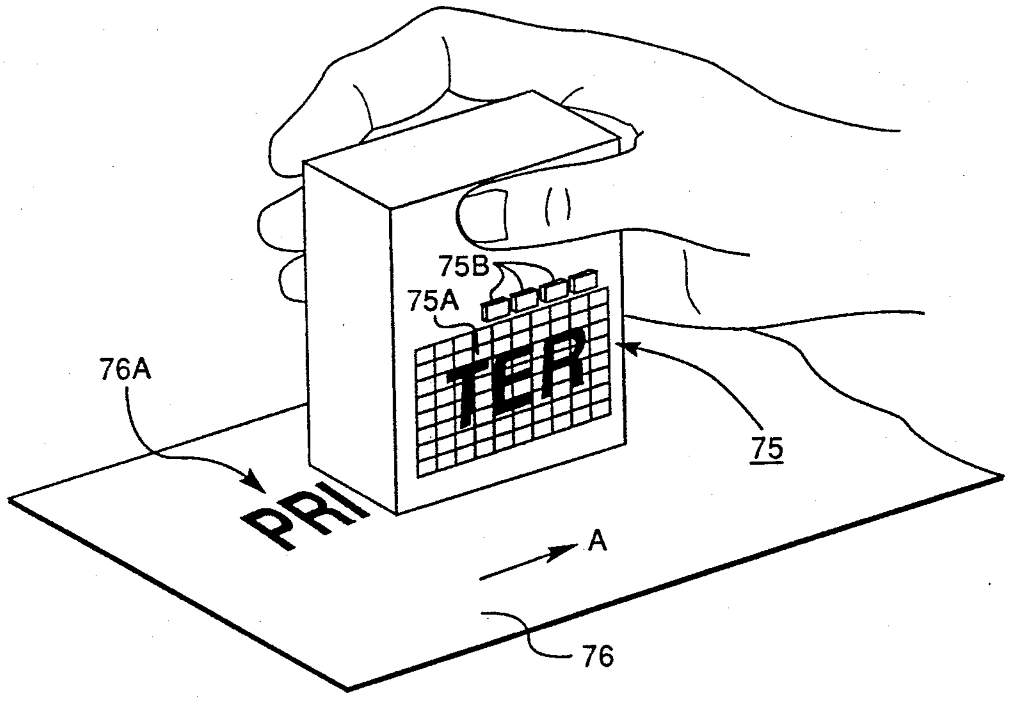
FIG. 9 is a perspective view illustrating the employment of the hand-held printer of this invention.

Printer unit 50 also includes an input display unit 75 on the other side surface thereof, as shown in FIG. 9. Input display unit 75 comprises a liquid crystal touch panel input and display 75A and associated input buttons 75B to enable both the input as well as the display and, therefore, the confirmation of information data being inputted to printer unit 50. Unit 75A comprises a combination transparent touch panel on the surface of printer unit 50 beneath which is a liquid crystal display panel. The touch panel is for the input of data, via hand written character recognition, while the LCD panel display where data is being placed as input or output by printer unit 50. Operation and preset of the display is accomplished by buttons 75B. While molde switch 56 has been disclosed as being on the other side of unit 50, mode switch 56 may alternatively be incorporated as part of display input unit 75, if so desired.

In transport unit 60, housing 63 rotatably supports supply roll 61A of transparent tape medium 61 within the confines of walls 63A, 63B and 63C of the unit. Medium 61 is drawn out an opening in housing unit 63 onto platen 64.

Also, in transport unit 60, support unit 65 rotatably supports roller 66 on a pair of bearing supports 65A comprising grooves in opposite side walls of unit 65. Pressure sensitive double coated adhesive tape roll 62A is supported on roller 66, as shown in FIG. 5A, and is arranged to be brought into engagement with transparent tape medium 61 after the latter mentioned tape medium has passed under and has been printed upon via thermal print head 51. Tape medium 62 travels together with printed transparent tape medium 61 along a common path through contact bonding means 70 arranged between guide roller 67 and press roller 68 and these two tape mediums are contact bonded to each other by means of press roller 68.

Figure 6:
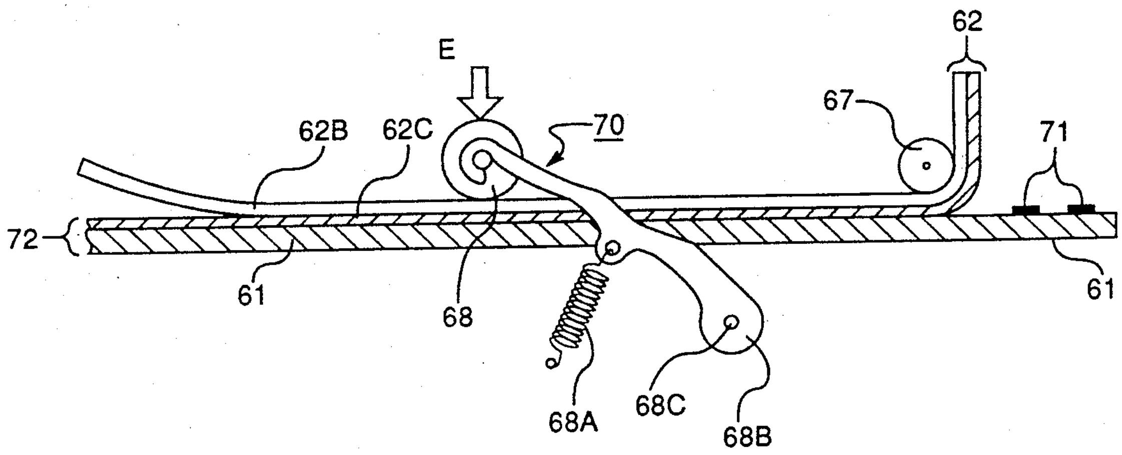
FIG. 6 is a detailed diagram of the contact bonding means for a pressure sensitive double coated adhesive tape medium and a transparent tape medium.

FIG. 6 discloses in closer detail contact bonding means 70 of FIG. 5A for contact bonding moving tape mediums 61 and 62. Bonding means 70 comprises roller 68, level 68B and coil spring 68A. Tape medium 61 is shown in FIG. 6 as having exited from printer unit 50 and containing a printed ink image 71 on its surface. Transparent tape medium 61 thereafter travals in contack with double coated adhesive tape medium 62 from the position of guide roller 67 and both tape mediums become contact bonded by means of press roller 68. Press roller 68 is rotatably supported on level 68B which is pivotable about point 62C. Roller 68 applies pressure perpendicularly to the plane of moving tape mediums 61 and 62, as indicated by arrow E in FIG. 6, due to force of coil spring 68A thereby rendering a firm bonding relationship between tape mediums 61 and 62.

As clearly illustrated in FIG. 6, double coated adhesive tape medium 62 comprises two protions: a pressure sensitive, double coated adhesive portion 62C and a separator portion 62B. Separator portion 62B is easily separated and removed from adhesive portion 62C and functions as support for portion 62C and as a means of separation for tape medium 62 as rolled upon medium roll 62A. When adhesive portion 62C has been contact bonded to imaged tape medium 61 and separator portion 62B has been removed, the final product is designated as imaged medium 72. Imaged medium 72 with its ink image 71, sandwiched between tape medium 61 and tape portion 62C, may then be applied to an object, such as a notebook, book, paper, machine, or any other object to which the adhesive backing of portion 62C will adhere to on pressure contact with such an object. Since the ink image 71 of imaged tape medium 72 is sealed between tape portion 62C and transparent tape medium 61, there is no possibility of having printing smudges, smears, stains or fragmentary portions of image 71 missing from the medium surface due to subsequent rubbing or scratching of medium 72.

Thus, imaged medium 72 may be easily handled after printing of image 71 since adhesive portion 62C functions as a protective layer for printed image 71 upon completion of contact bonding to transparent tape 61 and, further, provides an exposed adhesive surface for adhering to a surface of another object. In this connection, if mode switch 56 of printer unit 50 is in the inverted mode position, I, as shown in FIG. 5A, the image 71, e.g., "PRINT", will appear on the printing surface of transparent tape medium 61 in its inverted form, as indicated in FIG. 5B. In this case, the exposed adhesive surface of bonded adhesive portion 62C may be directly attached to an object. However, if mode switch 56 of printer unit 50 is in the normal mode position, N, the image 71 will appear on the printing surface of transparent tape medium 61 in its normal form. In this mode, if adhesive portion 62C is clearly transparent, the adhesive surface thereof may be directly attached to a transparent object to be viewed through such an object so that image 71 will clearly appear to the viewer in its normal upright position.

Figure 7:
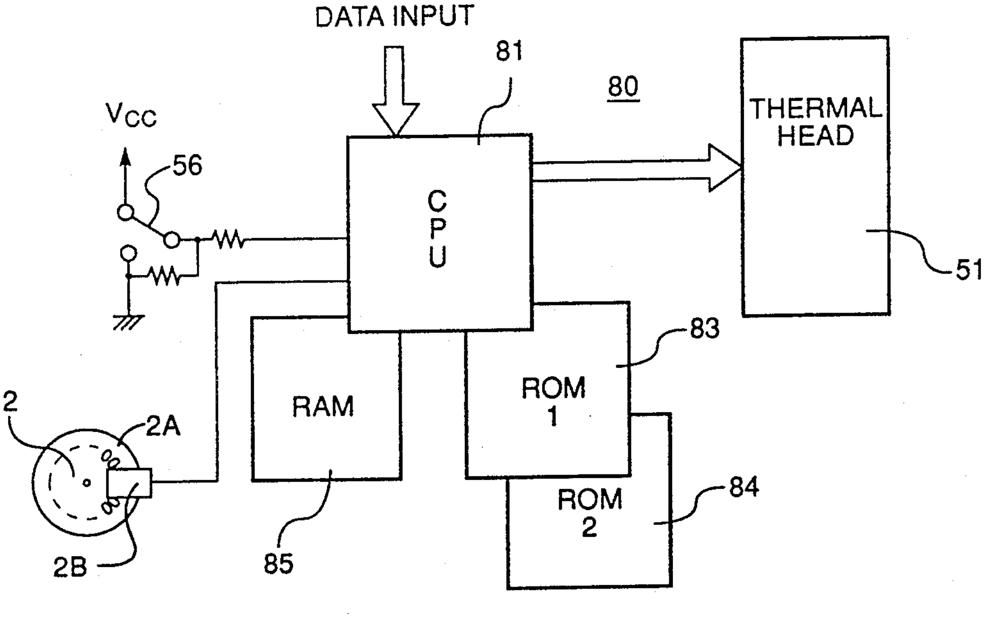
FIG. 7 is a block schematic diagram of controller circuit for the thermal print head.

FIG. 7 illustrates a block diagram of head controller means 80 for printer unit 50 and comprises mode switch 56 and encoder 2 coupled as inputs to CPU 81. As previously indicated, head controller means 80 may also be employed in conjunction with printer units 10 and 30. CPU 81 also as a parallel data input to and from three memories, i.e., ROMS 83, 84 and RAM 85 and a parallel data output to heating elements 42 in thermal print head 51. A computer program for controlling printer unit 50 is stored in ROM 82 while font and other print data, such as alphanumeric characters and symbols, are stored in ROM 84. The font data in ROM 84 is generally stored as byte data in hex code which represents binary data. RAM 85 is employed to temporarily store data input to controller means 82 and hold in memory image data obtained from ROM 84 based upon a match with information data received at the data input. Thus, CPU 81 operates under the control of the computer program to accept information data from the data input and match that data with corresponding information data in the font database in ROM 84. A copy of matched database information data is stored in RAM 85 for sequential transfer from RAM 85 via CPU 81 to thermal print head 51 for printing on transparent tape medium 61. CPU 81 selects data to be printed from RAM 85 and controls the transfer of the data to data transfer means, which includes IC chip 414, in the form of data columns $F_1$–$F_n$, as shown in FIG. 8, with each data column comprising n bits or pixels, D1 through $D_n$, e.g., 16 bits, D1–D16. It should be noted, however, that the column data, $D_n$, need not be 16 bits may be other values such as $D_n$ equal to 8, 24, or 32. If an 8 bit CPU is employed, the data is transferred to the accumulator of CPU 81 in 8 bit by 8 bit configuration.

CPU 81 monitors the status of printing mode selection means 56 to provide, via the computer program, a normal (upright) image or an inverted (upside down) image. Based upon data input, CPU 81 reads from RAM 85 matched font data stored in ROM 84, orders or reorders the serial sequence of the byte data in accordance with the mode format selected and provides the data to data transfer means, which selectively drives heating elements 42 of thermal head 51, in synchronism with timing pulses produced by encoder 2. As a result, image 71 is formed upon transparent tape medium 61 in synchronism with the rate of movement of this medium 61 through printer unit 50. CPU 81 also permits the data being printed to be displayed on liquid crystal touch panel input and display 75A, as previously indicated.

Figure 8A:
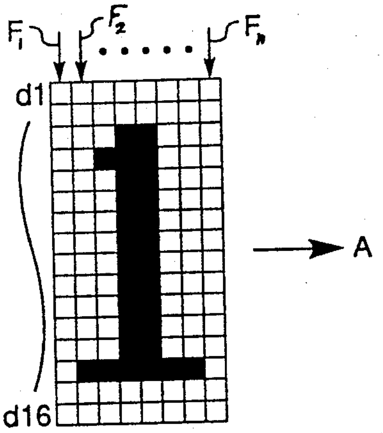
FIGS. 8A and 8B illustrate examples of font data for printing respectively in the normal mode, N, and the inverted mode, I.
Figure 8B:
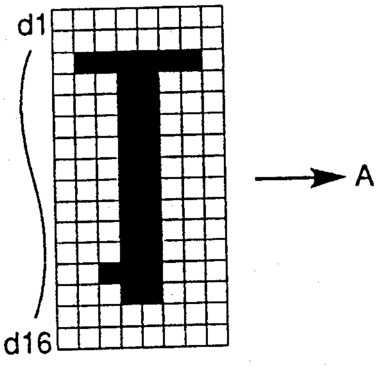

FIGS. 8 are specific examples of printing font data stored in ROM 84 for printing on a recording medium 76 employing hand-held printer unit 50 in the manner demonstrated in FIG. 9. This font data, identified as input to controller means 80, may be copied to and held in RAM 85 where it is sequentially fed out according to data columns $F_1$ through $F_n$ to the array of writing elements 42 in head 51 via IC driver 44. The arrow A in these figures indicates the direction of movement of printer unit 50 (or the thermal head 51) relative to recording medium 76. When mode switch 56 is in the normal position, N, CPU 81 will transmit pixel data D1 to D16 in the manner illustrated in FIG. 8A such that the columns $F_1$ through $F_n$ of data information thereof are sequentially transmitted to thermal head 51. When mode switch 56 is in the inverted position, I, CPU 81 will transmit the pixel data D1 to D16 in the manner illustrated in FIG. 8B such that the columns $F_1$ through $F_n$ of data information are reordered or rotated from the CPU accumulator and then is outputed as serial data from CPU 81 and sequentially transmitted to data transfer means in thermal head 51. The ordered data from CPU 81 is generally ported as serial data but this data may also be ported parallel if made acceptable at the data transfer means. In any case, the conversion to serial format is clocked as data input into data transfer means which comprises a serial to parallel shift register, and is then buffered by a parallel latch circuit and then, in turn, is strobed, via the encoder signal developed at encoder 2, through AND gate/switching circuits to the thermal printing elements 41. The connection between CPU 81 and thermal head 51 includes the following input lines 46 (FIG. 3) to IC chip 44: a serial data line, a clock line to enable the serial to parallel shift register, a latch clock to enable the parallel latch circuits, a strobe signal to the AND gate/switching circuits to enable the writing of data at writing elements 42, voltage supply, $V_{DD}$, for operation of IC chip 44 and ground or reference potential. This type of data transfer means is exemplified in FIG. 2 of either U.S. Pat. No. 4,689,638 or U.S. Pat. No. 4,707,706, which are incorporated herein by reference thereto.

Thus, CPU 81, ROM's 83, 84 RAM 85, and mode switch means 56 together constitute head controller means 80 for operational mode selection, for example, of either a normal or upright font character or symbol, or an inverted or upside down font character or symbol.

FIG. 9 illustrates the operation of printer unit 50 when this unit is not employed in conjuction with recording medium transport unit 60. In operation, drive roller 52 and guide roll 53 with interposed thermal head 51 are brought into contact with recording medium 76, which may be, for example a sheet of ordinary paper, or a resin or plastic film or the like. Printer unit 50 is then moved in the direction indicated by arrow A whereby drive roller 52 brings about operation of ink ribbon 55 via takeup roll 54 and also encoder 2 so that data information is printed on medium 76, as shown at 76A in FIG. 9.

Figure 10:
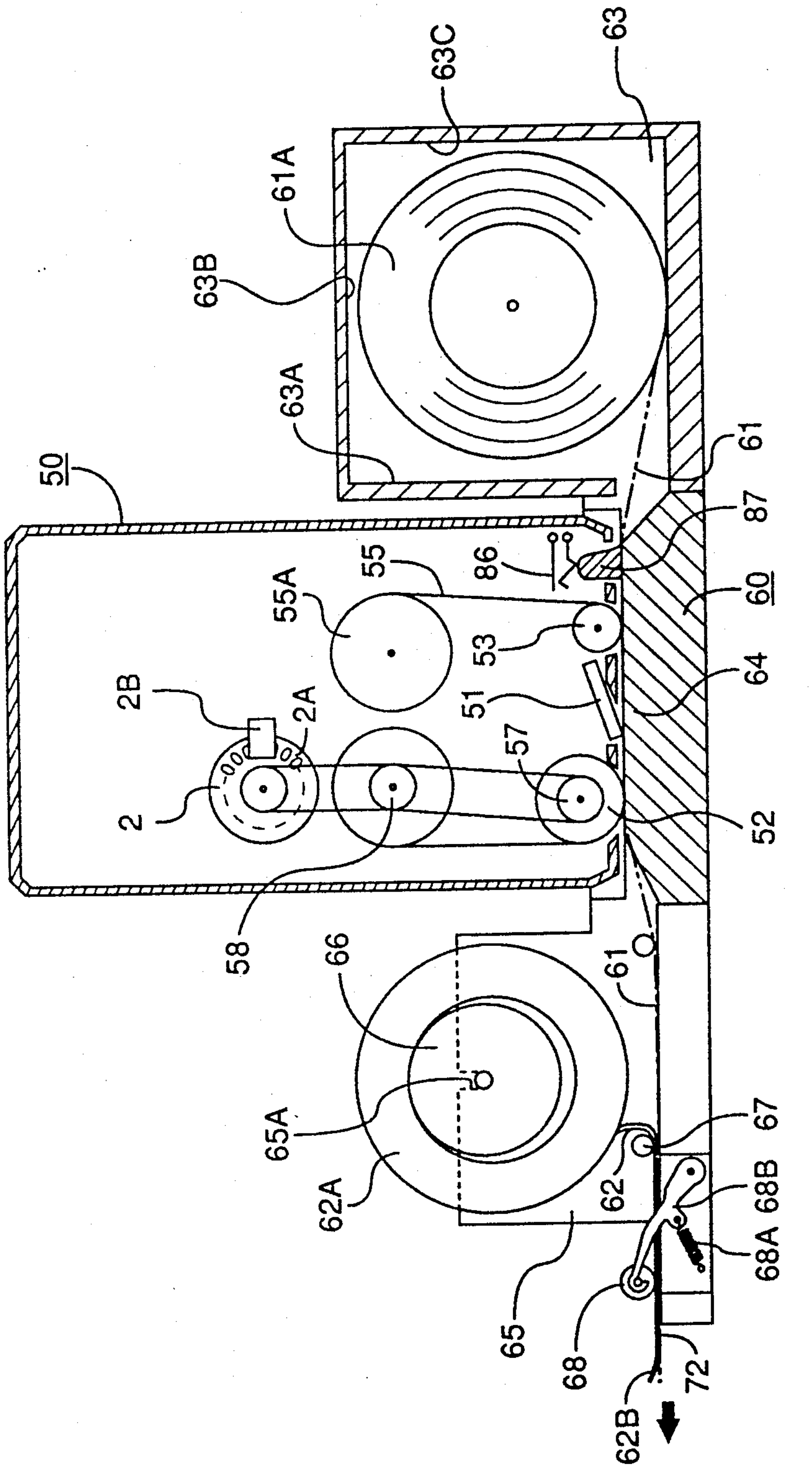
FIG. 10 is a schematic view of another embodiment of a portable printing system comprising a hand-held printer and a recording medium transport unit in accordance with this invention.

FIG. 10 illustrates another embodiment of a portable printer unit of this invention and is very similar to the embodiment shown in FIG. 5. Since its basic arrangement is substantially identical with FIG. 5, identical components are denoted by the same reference numerals and the description thereof will not be repeated here. In FIG. 10, rather than employing a manual mode switch 56 as shown in FIG. 5A, means for automatic mode selection is provided. This means is in the form of abutment or projection 87 provided on the surface of platen 64 of medium transport unit 60 adjacent to the path of travel of medium 61. Projection 87 engages detection means 86 when printer unit 50 is detachably mounted on medium transport unit 60. Detection means 86 comprises a switch element that will be closed due to engagement by projection 87 when unit 50 is mounted on unit 60. As a result, the inverted mode, I, is automatically selected as input to head controller means 80 so that an inverted image is readily printed on the surface transparent tape 61, as illustrated in FIG. 5B.

Thus, in accordance with this invention, a portable hand-held printer may function as a simple word processor, labeling or printing machine either by itself or in conjuction with a recording medium transport unit providing a compact, lightweight and inexpensive printer unit that provides the dual function of printing on a tape medium supported and guided by the transport unit as well as printing on a sheet medium while being hand held. The design of this invention offers the additional advantages of contributing not only to the expansion of the application of a portable hand-held printer to provide the above mentioned dual functionality but also providing a hand-held printer that may also employ commercially available inexpensive tape media so that operational costs of the printer are low. In addition, since a lettered or imaged tape medium may be prepared with the printed image on a transparent tape medium in bonded contact with an adhesive tape medium so that the printed image is sandwiched and sealed between the two tape mediums, the printed image is protected from exposure to the environment and deterioration in printing quality, including, for example, smudges, smears, stains or scratches on the image surface which may resulting in some partial unintelligence of the images. Therefore, the utility of this invention conveniently provides an extremely reliable, long lasting, permanent ink image on a conventional tape medium.

Furthermore, since a system is adopted for automatically detecting the mounting or demounting of the printer unit relative to the recording medium traveling unit, the operation of the unit becomes very simple so that children as well as adults may readily use the printer unit either alone or in combination with the recording medium transport unit without having to manually set the required printing mode.

While the invention has been described in conjuction with several specific embodiments, it is evident to those skilled in the art that many further alternatives, modifications and variations will be apparent in light of the forgoing description. Thus, the invention described herein is intended to embrace all such alternatives, modifications and variations as fall within the spirit and scope of the appended claims.

What is claimed is:

1. A hand-held thermal printer for printing an image on a recording medium through the use of a thermal print head via an ink ribbon, comprising:

means for selecting one of two printing modes for said printer, said modes comprising a normal image printing mode and an inverted image printing mode, a transparent tape medium for travel between said thermal print head in conjunction with an ink ribbon and onto which ink is transferred via said head to form an image on said moving medium, tape medium transport means for holding said tape medium and for stabilizing the travel of said tape medium relative to said printer, a pressure sensitive double coated adhesive tape medium comprising an adhesive portion and a separator portion and provided to travel in conjunction with said transparent tape medium after printing has been accomplished on said transparent tape medium, means to contact bond said double coated adhesive tape medium with said transparent tape medium thereby protecting said image printed thereon, and tape medium transport means for holding said tape medium and for stabilizing the travel of said double coated adhesive tape medium and said transparent tape medium through said bonding means.

2. The hand-held thermal printer of claim 1 which further includes means detachably mounted to said printer and having a platen means to support said transparent tape medium on a platen for travel in adjacently opposed relation relative to said thermal print head, said printing mode selection means set to said inverted image printing mode.

3. The hand-held thermal printer of claim 2 wherein said platen means comprises a movable closed loop belt.

4. The hand-held thermal printer of claim 2 wherein said platen means comprises a smooth surface with at least portions thereof having a bearing surface having a low coefficient of friction.

5. The hand-held thermal printer of claim 2 wherein when said detachable mounted means is removed from said printer for printing, said printing mode selection means is set for said normal image printing mode.

6. A portable printer system comprising:

a printer unit having mode selection means for selecting between a normal image printing mode and an inverted image printing mode, a thermal print head and an ink ribbon, a recording medium transport unit comprising a platen, a first supply means for dispensing a recording medium, means for supporting said recording medium for travel on said platen through said transport unit, a second supply means for dispensing a pressure sensitive double coated adhesive medium and means for supporting said adhesive medium for travel in conjunction with said recording medium after printing on the latter, said printer unit being detachably mounted on said transport unit wherein said printer unit can effectuate printing directly on said recording medium while operating in one of said modes and removed from said transport unit for hand-held printing directly onto a recording medium while operating in the other of said modes.

7. The portable printer system of claim 6 further comprising means at said second supply means for contact bonding said mediums.

8. The portable printer system of claim 6 wherein said printer unit is selected to operate in said normal image printing mode when detached from said transport means and is selected to operate in said inverted image printing mode when attached to said transport means.

9. The portable printer system of claim 8 which further comprises electrical engagement means on both said printer unit and said transport unit to automatically determine the selection of said mode dependent upon said detachment or attachment of said printer unit relative to said transport unit.

10. The portable printer system of claim 9 wherein said engagement means comprises an electrical limit switch means in said printer unit and a projection means in said transport unit.

11. A portable printer for printing an image on a recording medium comprising:

a hand-held printer unit comprising a print head and print head controlling means for controlling the operation of said print head, a recording medium transport unit detachably engaged with said printer unit for supporting a recording medium supply and guiding the travel of said recording medium through said transport unit, means on said units to detect the presence or absence of said printer unit on said transport unit, said print head controller means including mode selection means for selecting the printing of information data supplied to said printer unit between a normal image printing mode and an inverted image printing mode, said detection means automatically selecting said mode upon its determination as to whether said printer unit is mounted on or demounted from said transport unit.

12. The printer according to claim 11 wherein said print head comprises a thermal print head.

13. A portable printer for printing information data on a recording medium in a designated direction comprising:

a hand-held printer means having a print head and print head controller means including CPU means to receive data to be printed from data input means and present said data to said print head, said controller means including mode selection means to select via said CPU means the mode of printing of said data between (1) a normal image printing mode wherein said data is printed right-side-up on said recording medium in said designated direction and (2) an inverted image printing mode wherein said data is printed upside down on said recording medium in said designated direction.

14. The portable printer of claim 13 including transport means for supporting the travel of said recording medium relative to said printer means, said mode selection means set to said inverted image printing mode.

15. The portable printer of claim 14 including means in said printer means and said transport means to detect the presence or absence of said printer means relative to engagement with said transport means to automatically set said mode selection means to one of said modes.

16. The portable printer of claim 13 wherein said printer means includes drive roller means in engagement with said recording medium and encoder means coupled to said drive roller means to generate timing pulses to synchronize the printing of said information data on said recording medium with the rate of movement of said printing means relative to said recording medium.

17. The portable printer of claim 13 including encoder means in said printer means to generate timing pulses for synchronization of the printing said information data on said recording medium relative to the instantaneous rate of movement between said printer means and said recording medium.

18. A portable printer for printing information data on a recording medium comprising:

a hand-held printer means having a print head, data input means and print head controller means, said controller means including CPU means, first memory means for storing image database information therein, second memory means for storing a computer program, and third memory means for storing information to be printed based upon information data received from said data input means, said CPU means coupled to said print head and said memory means and operated under the control of said computer program to accept information data from said input means and match said input information data with corresponding database information, and store a copy of matched database information in said third memory means for sequential transfer to said print head for printing on said recording medium, said controller means including mode selection means to select via said CPU means the mode of printing of said matched database information between (1) a normal image printing mode wherein said matched information is printed right-side-up on said recording medium and (2) an inverted image printing mode wherein said matched database information is printed upside down on said recording medium.

19. The portable printer of claim 18 including transport means for supporting the travel of said recording medium relative to said printer unit, said mode selection means set to said inverted image printing mode.

20. The portable printer of claim 19 including means in said printer means and said transport means to detect the presence or absence of said printer means relative to engagement with said transport means to automatically set said mode selection means to one of said modes.

21. The portable printer of claim 18 wherein said printer means includes drive roller means in engagement with said recording medium and encoder means coupled to said drive roller means to generate timing pulses to synchronize the printing of said information data on said recording medium with the rate of movement of said printing means relative to said recording medium.

22. The portable printer of claim 18 including encoder means in said printer means to generate timing pulses for synchronization of the printing said information data on said recording medium relative to the instantaneous rate of movement between said printer means and said recording medium.

23. A portable printer for printing information data on a recording medium comprising:

a hand-held printer means having a print head with printing elements, data input means and print head controller means, detection means for indicating the start of a printing position according to the movement of said printer relative to said recording medium and produce a signal representative of the rate of movement of said printer relative to said recording medium, said controller means including CPU means, first memory means for storing image database information therein, second memory means for storing a computer program, and third memory means for storing information to be printed based upon information data received from said data input means and data transfer means, said CPU means coupled to said print head, said detection means, said memory means and operated under the control of said computer program to accept information data from said input means and match said input information data with corresponding database information, and store a copy of matched database information in said third memory means for sequential transfer to said print head for printing on said recording medium, said data transfer means to transfer via said CPU said matched database information in units of columned data from said third memory means to said printer head printing elements in synchronism with said detection means signal, said controller means including mode selection means to select via said CPU means the mode of printing of said matched database information between (1) a normal image printing mode wherein said matched information is transferred to said print head in an arrangement of unit right side up columned data and print said matched information right-side-up on said recording medium and (2) an inverted image printing mode wherein said matched database information is transferred to said print head in an arrangement of unit upside down columned data and print said matched database information upside down on said recording medium.

24. The portable printer of claim 23 including transport means for supporting the travel of said recording medium relative to said printer unit, said mode selection means set to said inverted image printing mode.

25. The portable printer of claim 24 including means in said printer means and said transport means to detect the presence or absence of said printer means relative to engagement with said transport means to automatically set said mode selection means to one of said mode.

26. A hand-held thermal printer for printing an image on a recording medium through the use of a thermal print head via an ink ribbon and comprising:

print generator means to form inverted image data at said print head to print said data upside down on said recording medium in the direction of medium travel, a transparent tape medium comprising said recording medium for travel between said thermal print head in conjuction with an ink ribbon and onto which ink is transferred via said head to form said inverted image on said traveling medium, tape medium transport means for holding said tape medium and for stabilizing the travel of said tape medium relative to said printer, a pressure sensitive double coated adhesive tape medium comprising an adhesive portion and a separator portion and provided to travel in conjuction with said transparent tape medium after printing has been accomplished on said transparent tape medium, means to contact bond said double coated adhesive tape medium with said transparent tape medium thereby protecting said image printed thereon, and tape medium transport means for holding said tape medium and for stabilizing the travel of said double coated adhesive tape medium and said transparent tape medium through said bonding means.

27. The hand-held thermal printer of claim 26 which further includes means detachably mounted to said printer and having a platen means to support said transparent tape medium on a platen for travel in adjacently opposed relation relative to said thermal print head.

28. The hand-held thermal printer of claim 22 wherein said platen means comprises a movable closed loop belt.

29. The hand-held thermal printer of claim 22 wherein said platen means comprises a smooth surface with at least portions thereof having a bearing surface having a low coefficient of friction.

* * * * *